United States Patent
Corman et al.

(10) Patent No.: US 7,269,411 B2
(45) Date of Patent: Sep. 11, 2007

(54) METHODS AND SYSTEMS FOR PROVIDING INFORMATION NETWORK ACCESS TO A HOST AGENT VIA A GUARDIAN AGENT

(75) Inventors: David E. Corman, Creve Coeur, MO (US); Thomas S. Herm, Frontenac, MO (US); Steven A. Dorris, Ofallon, MO (US); Eric J. Martens, Crestwood, MO (US)

(73) Assignee: The Boeing Company, Chicago, IL (US)

( * ) Notice: Subject to any disclaimer, the term of this patent is extended or adjusted under 35 U.S.C. 154(b) by 130 days.

(21) Appl. No.: 10/869,334

(22) Filed: Jun. 16, 2004

(65) Prior Publication Data
US 2005/0282527 A1    Dec. 22, 2005

(51) Int. Cl.
*H04M 3/42* (2006.01)
*H04L 29/06* (2006.01)
*G06F 15/16* (2006.01)
*H04Q 7/22* (2006.01)

(52) U.S. Cl. .............. 455/414.1; 455/414.2; 455/414.3; 709/203; 709/217; 709/218

(58) Field of Classification Search ................ 709/201, 709/227, 228, 229, 203, 217, 218; 455/414.1, 455/414.2, 414.3
See application file for complete search history.

(56) References Cited

U.S. PATENT DOCUMENTS

| | | | | |
|---|---|---|---|---|
| 6,144,996 | A * | 11/2000 | Starnes et al. | 709/217 |
| 6,266,664 | B1 * | 7/2001 | Russell-Falla et al. | 707/5 |
| 6,604,143 | B1 * | 8/2003 | Nagar et al. | 709/229 |
| 6,622,031 | B1 * | 9/2003 | McCleary et al. | 455/575.7 |
| 6,885,861 | B2 * | 4/2005 | Koskelainen | 455/414.2 |
| 2001/0044818 | A1 * | 11/2001 | Liang | 709/201 |
| 2002/0138601 | A1 * | 9/2002 | Piponius et al. | 709/223 |

* cited by examiner

*Primary Examiner*—George Eng
*Assistant Examiner*—Wesley Kim
(74) *Attorney, Agent, or Firm*—Lee & Hayes, PLLC

(57) ABSTRACT

Methods, systems, and articles of manufacture consistent with the present invention provide a first data processing system access to a network via a second data processing system. An object is sent to the second data processing system, which object when instantiated on the second data processing system implements a network access program that can subscribe to information from the network and publish information to the network. Subscribed to information is received from the second data processing system.

13 Claims, 7 Drawing Sheets

METHODS AND SYSTEMS FOR PROVIDING INFORMATION NETWORK ACCESS TO A HOST AGENT VIA A GUARDIAN AGENT

STATEMENT REGARDING FEDERALLY SPONSORED RESEARCH

The present invention was made with government support under contract number F33615-97-D-1155 awarded by the United States Air Force. Accordingly, the United States Government has certain rights in the present invention.

BACKGROUND OF THE INVENTION

The present invention generally relates to the field of network communication and, more particularly, to methods and systems for providing information network access to a remote device.

Global information networks such as the Internet, the world wide web, and the United States military's global information grid (GIG) can provide information to a variety of users. The global information grid consists of nodes linked by high-capacity networks. To take advantage of the global information grid's capability to supply information, it is desirable to connect mobile and stationary nodes, such as manned and unmanned systems, to the global information grid. The mobile nodes can be, but are not limited to, military or commercial vehicles, such as spacecraft, aircraft, surface ships, submersible ships, land vehicles, and individuals. Global information, such as weather, news, and other data, will be available to the mobile nodes. However, due to current limitations of nodes, such as limited communication bandwidth, the nodes cannot take advantage of the global information grid's information.

SUMMARY OF THE INVENTION

Methods, systems, and articles of manufacture consistent with the present invention provide information network access to a host agent via a guardian agent. The host agent and guardian agent can be located at different locations and communicate via a communication link. The guardian agent is coupled to an information network, such as the global information grid or the Internet, and provides the host agent access to the information network although the host agent does not directly access the information network. Therefore, the host agent can access information from the information network, such as weather, news, and other data, that it would typically not be able to access due to limitations in the host agent's platform, such as limited bandwidth capability of the host agent platform.

In accordance with methods consistent with the present invention, a method in a data processing system having a program for providing access to a network via a second data processing system is provided. The method comprises the steps of: sending to the second data processing system an object which, when instantiated on the second data processing system, implements a network access program that can subscribe to information from the network and publish information to the network; and receiving subscribed to information from the second data processing system.

In accordance with articles of manufacture consistent with the present invention, a computer-readable medium containing instructions that cause a first data processing system having a program to perform a method for providing access to a network via a second data processing system is provided. The method comprises the steps of: sending to the second data processing system an object which, when instantiated on the second data processing system, implements a network access program that can subscribe to information from the network and publish information to the network; and receiving subscribed to information from the second data processing system.

In accordance with systems consistent with the present invention, a data processing system for providing access to a network via a second data processing system is provided. The data processing system comprises a memory having a program that: sends to the second data processing system an object which, when instantiated on the second data processing system, implements a network access program that can subscribe to information from the network and publish information to the network; and receives subscribed to information from the second data processing system. A processing unit runs the program.

In accordance with systems consistent with the present invention, a data processing system for providing access to a network via a second data processing system is provided. The data processing system comprises: means for sending to the second data processing system an object which, when instantiated on the second data processing system, implements a network access program that can subscribe to information from the network and publish information to the network; and means for receiving subscribed to information from the second data processing system.

Other features of the invention will become apparent to one with skill in the art upon examination of the following figures and detailed description. It is intended that all such additional systems, methods, features and advantages be included within this description, be within the scope of the invention, and be protected by the accompanying drawings.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Figure 1:
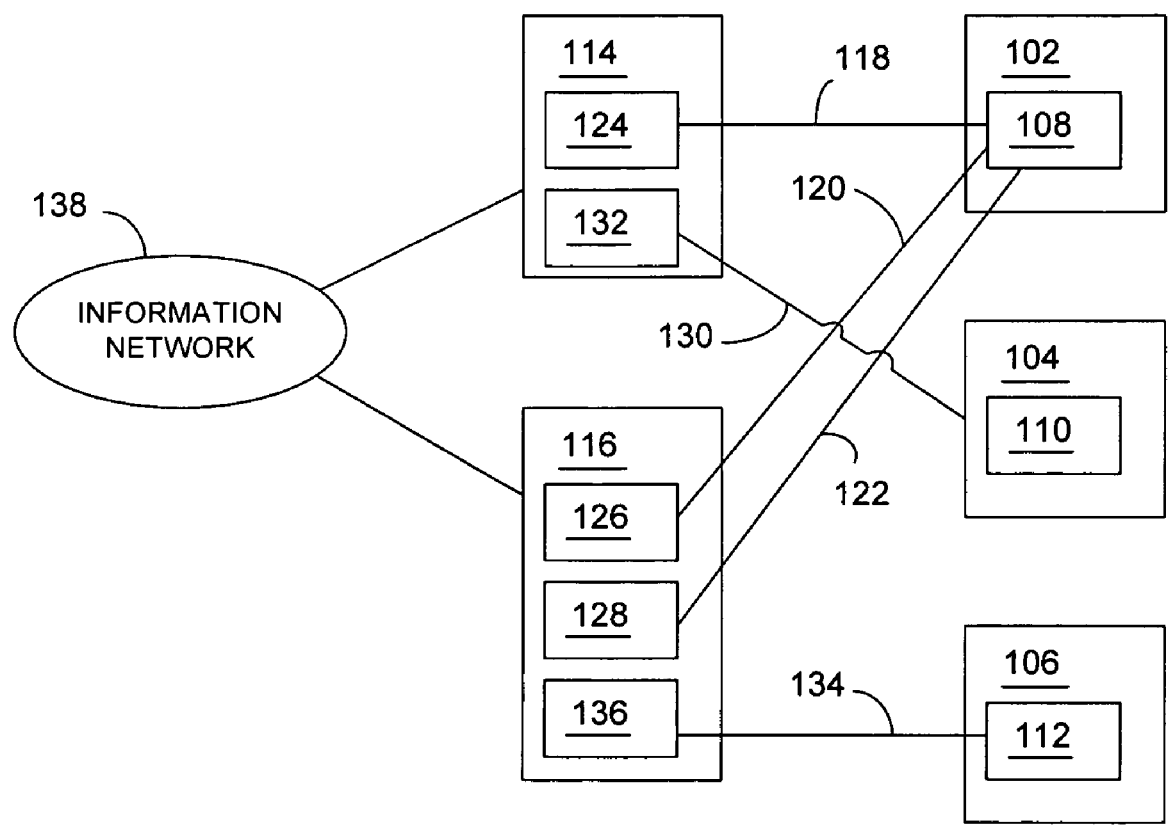
FIG. 1 is a schematic diagram of a system providing information network access to a host agent via a guardian agent consistent with the present invention.

Reference will now be made in detail to an implementation in accordance with methods, systems, and articles of manufacture consistent with the present invention as illustrated in the accompanying drawings. Wherever possible, the same reference numbers will be used throughout the drawings and the following description to refer to the same or like parts.

Methods, systems, and articles of manufacture consistent with the present invention provide a host agent with access to an information network, such as the global information grid, via a guardian agent, which is coupled to the information network. The host agent and guardian agent are preferably located at different locations and communicate via a communication link, however, the host agent and guardian agent can be at the same location. For example, the host agent and guardian agent can be located on the same or different stationary or mobile platforms, such as spacecraft, aircraft, surface ships, submersible ships, land vehicles, individuals, or buildings. Further, the host agent platform and guarded platform (on which the guardian agent is located) can be a military or commercial platforms. The guardian agent is coupled to an information network, such as the global information grid or the Internet, and provides the host agent access to the information network although the host agent does not directly access the information network. Therefore, the host agent can access information from the information network, such as weather, news, and other data, that it would typically not be able to access due to limitations in the host agent platform, such as limited bandwidth capability of the host agent platform.

In an illustrative example, the host agent platform is a military fighter aircraft, such as the F-15 fighter, and the guarded platform is a command and control (C2) platform, such as an airborne warning and control (AWAC) aircraft. The guardian agent is coupled to the global information grid. Alternatively, the host agent and guarded platforms can be other types of platforms. For example, the host agent platform can be a truck and the guarded platform can be in a building. The guardian agent obtains and filters information available in the global information grid and provides the host agent platform with useful information. The guardian agent also can act as an intelligent proxy for the represented platform in that it can make assessments of global-information-grid-available information for effects on the host agent platform's mission. The guardian agent also provides the ability to enable fielded systems to become homogenous, intelligent command-able resources from the command/control platform's perspective. The guardian agent does this by enabling a generalized bidding process whereby guardian agents can bid on missions (based on capabilities of the host agent platforms) for dynamic mission requests from a command/control platform or other guarded platforms. Further, the guardian agent can send information received from the host agent to the global information grid.

Therefore, the host agent and guardian agent provide information that was previously not available to the fighter aircraft platform. And they further provide the command and control platform operators with real-time awareness of dynamic changes to the battlefield. From the fighter aircraft's perspective, the host agent and guardian agent enable the platform to gain access to information that can magnify its survivability and effectiveness. From the command and control platform's perspective, the host agent and guardian agent can enable the fighter aircraft platform to become a smart resource for the command and control platform's operators.

Through the information network, the fighter aircraft can receive sensor data on "over the horizon" threats to the fighter aircraft. These are threats that lie along its mission route and which would not typically be detectable by the fighter aircraft's sensors until late into a mission. Using the information network, the fighter aircraft can gain access to sensor reports from other platforms providing coverage along its route. The information network allows each sensor in the battlefield to become virtual sensor for the fighter aircraft. The information network can also provide timely information (such as intelligence images) that can affect its mission. From the command and control platform's viewpoint, it is desirable in a dynamic battlefield to have access to "smart resources" that can have their missions dynamically changed or provide dynamic information. The information network provides the infrastructure for implementing this capability.

Further, as the guardian agent filters information prior to sending the information to the host agent, the host agent's platform and its operator are not overloaded with information.

FIG. 1 depicts a block diagram of a system 100 for providing information network access to a host agent via a guardian agent consistent with the present invention. As illustrated, the system 100 generally comprises host agent platforms 102, 104 and 106. Each host agent platform includes a host data processing system having a host agent thereon. As shown, host agent platform 102 includes a host data processing system host agent 108, host agent platform 104 includes a host data processing system 110, and host agent platform 106 includes a host data processing system 112. As will be described in more detail below, each host agent provides an interface between an associated guardian agent and the host agent's platform. In the illustrative example, the host agent platform is a fighter aircraft. Accordingly, the host agent provides an interface between the guardian agent on the command/control platform and the fighter aircraft's pilot.

Figure 2:
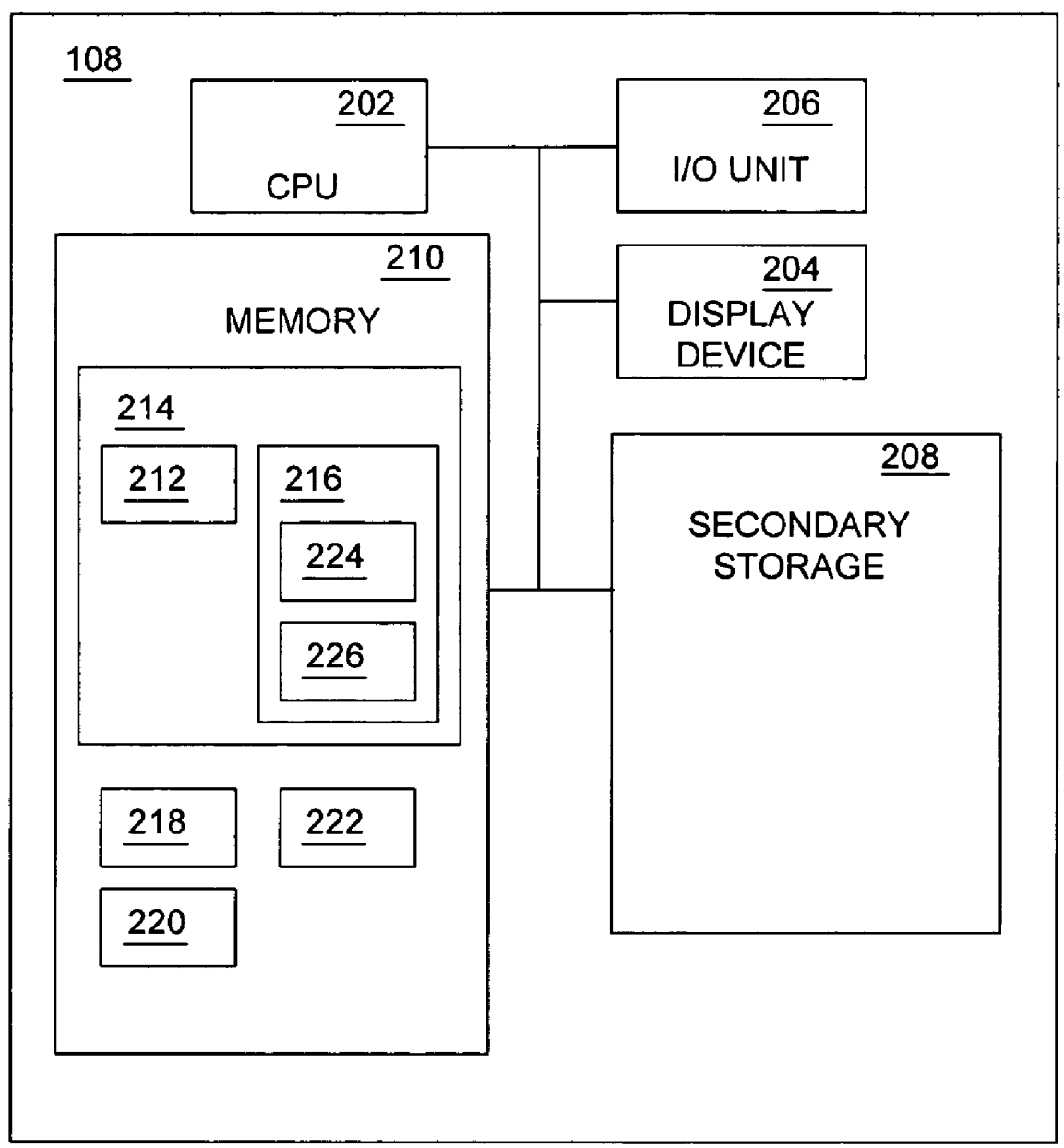
FIG. 2 is a block diagram of a host data processing system consistent with the present invention.

FIG. 2 depicts a host data processing system, such as host data processing system 108, in more detail. Host data processing system 108 comprises a central processing unit (CPU) or processor 202, a display device 204, an input/output (I/O) unit 206, a secondary storage device 208, and a memory 210. The host data processing system may further comprise standard input devices such as a keyboard, a mouse or a speech processing means (each not illustrated).

Memory 210 comprises a wrapper 216, which includes a host agent 212 and a platform template 216, a host communication program 218, a pilot vehicle interface 220, and an operational flight program 222. Host agent 212 provides an information interface between a corresponding guardian agent and the host agent platform. That is, the host agent can read and write information to the information network for the host agent platform via the guardian interface. In the illustrative example, the host agent defines tactical system information requirements, sets priorities and deadlines for quality of service logic, and transmits information to and receives information from the guardian agent to update the host agent platform's weapons system. Platform template 216 includes a definition of the host agent platform for instantiation of the guardian agent. The platform template also provides mobile code that can contain platform-specific behavior for the instantiated guardian agent. Host communication program 218 manages communication between the host agent and the guardian agent. Pilot vehicle interface 220 provides an interface between the host agent and the host agent platform, including for example functionality to receive information from the host agent and to display the information to the pilot on the display device. Operational flight program 222 controls the host agent platform. Each of these programs will be described in more detail below.

Referring back to FIG. 1, the host agents communicate with corresponding guardian agents, which are located on guarded platforms 114 and 116. As shown, host agent 108 communicates via communication links 118, 120 and 122 to guardian agents 124, 126 and 128, respectively. Host agent 110 communicates via a communication link 130 to a guardian agent 132. Host agent 112 communicates via a communication link 134 to guardian agent 136. In the illustrative example, the communication links are radio frequency signals implemented in the Link 16 protocol. One having skill in the art will appreciate that alternative communication links and protocols can be used.

Each guardian agent performs services for its guarded platform using information that it obtains from the information network 138. As will be described in more detail below, in the illustrative example, the guardian agent can subscribe to information network services that provide relevant information to the host agent platform; conduct analyses of potential threats using information network provided information; provide reports to the host agent platform on entities that threaten the host agent platform; provide the host agent platform with virtual target folders containing information on time critical targets; publish to the information network information from the host agent platform; support an intelligent bidding process for new or dynamic changes to missions, and provides platform-specific, run-time customizable behavior via use of a module design and mobile code that can be transmitted in a platform template from the host agent platform to the guardian agent data processing system via a communication link.

Figure 3:
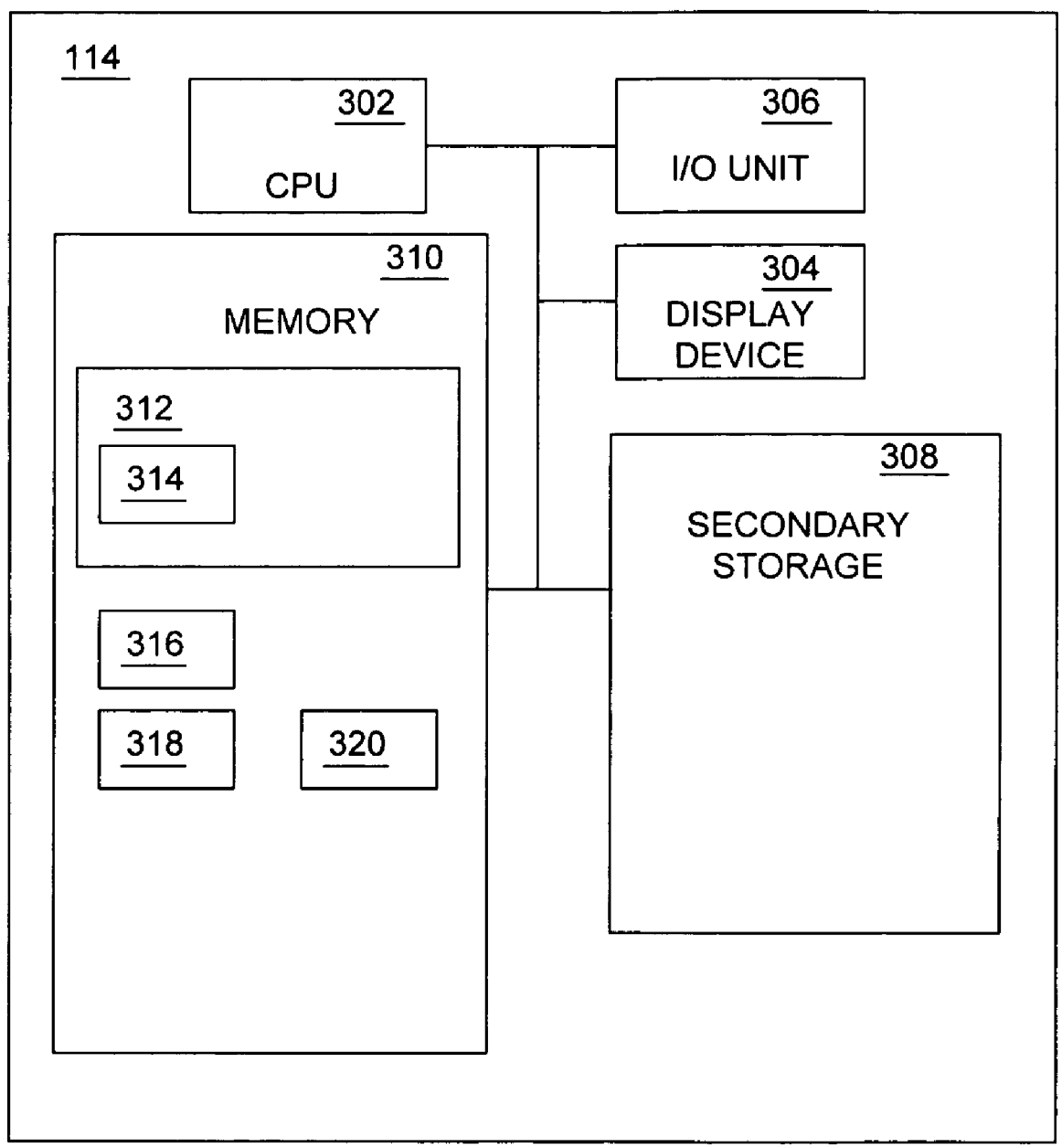
FIG. 3 is a block diagram of a guardian data processing system consistent with the present invention.

Each guardian agent is implemented on a corresponding guardian data processing system 114 or 116. FIG. 3 depicts a schematic block diagram of a guardian data processing system, such as guardian data processing system 114, in more detail. Guardian data processing system 114 comprises a central processing unit (CPU) or processor 302, a display device 304, an input/output (I/O) unit 306, a secondary storage device 308, and a memory 310. The guardian data processing system may further comprise standard input devices such as a keyboard, a mouse or a speech processing means (each not illustrated).

Memory 310 comprises a guardian agent 312, a guardian communication program 316, and an information network communication program 318. Guardian communication program 316 is similar to host communication program 218 and manages communication between the host agent and the guardian agent from the guardian agent side of a communication link. Information network communication program 318 manages interfacing to the information network. Each of these programs will be described in more detail below.

In the illustrative example, the various programs described herein are implemented in Unified Modeling Language (UML), however, the programs can be implemented in one or more different programming languages.

One having skill in the art will appreciate that the host agent and guardian agent can reside in memory on a system other than the depicted data processing system. The host and guardian agents may comprise or may be included in one or more code sections containing instructions for performing their respective operations. While the host and guardian agents are described as being implemented as software, the present implementation may be implemented as a combination of hardware and software or hardware alone. Also, one having skill in the art will appreciate that the host and guardian agents may comprise or may be included in a data processing device, which may be a client or a server, communicating with the respective host or guardian data processing system.

Although aspects of methods, systems, and articles of manufacture consistent with the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of data processing systems have been described, one having skill in the art will appreciate that a data processing system suitable for use with methods, systems, and articles of manufacture consistent with the present invention may contain additional or different components.

The host and guardian data processing systems can also be implemented as client-server data processing systems. In that case, the host agent or guardian agent can be stored on the respective data processing system as a client, while some or all of the steps of the processing described below can be carried out on a remote server, which is accessed by the client over a network. The remote server can comprise components similar to those described above with respect to the data processing system, such as a CPU, an I/O, a memory, a secondary storage, and a display device.

Figure 4:
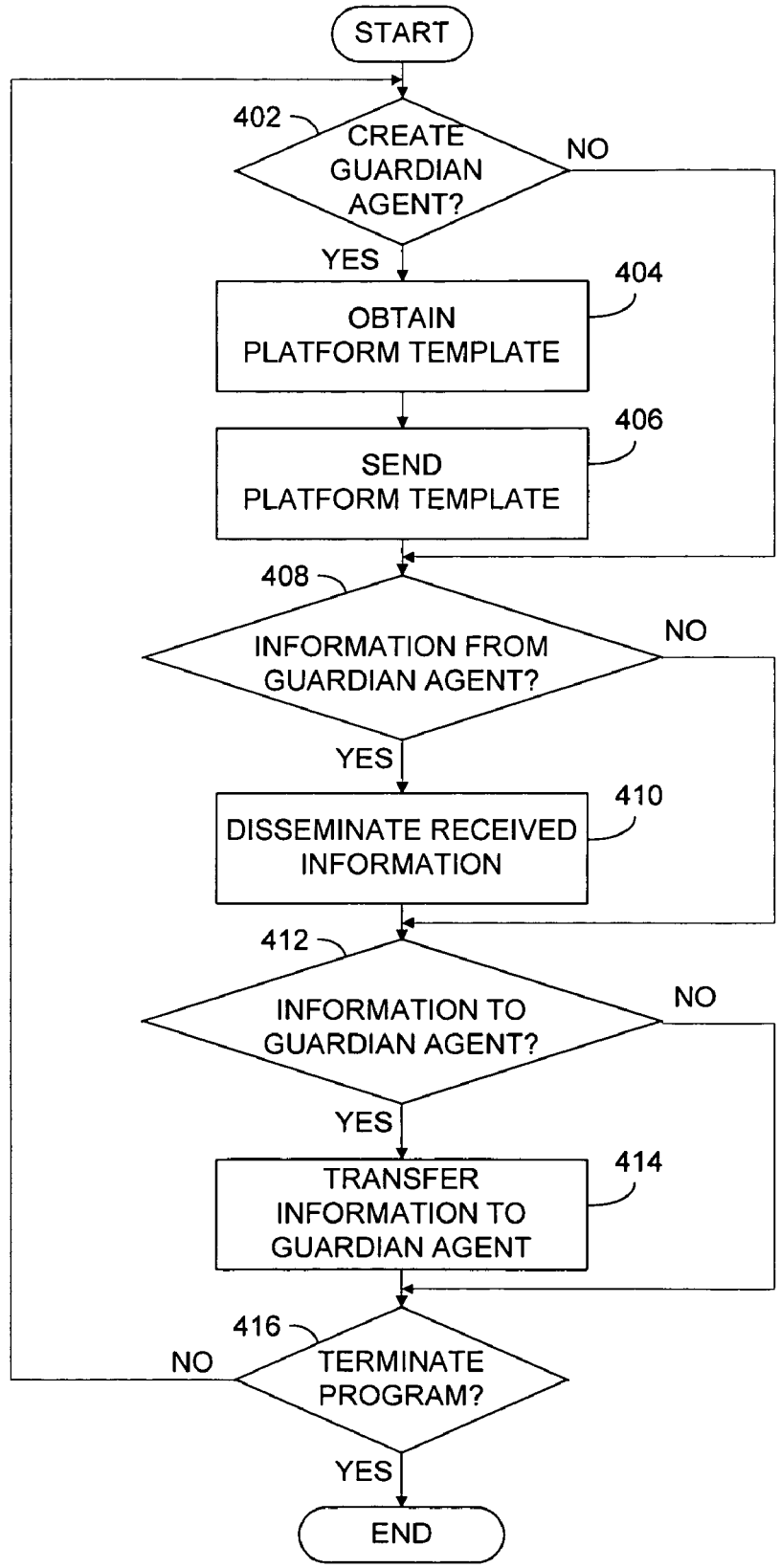
FIG. 4 is a flow diagram of the exemplary steps performed by the host agent consistent with the present invention.

FIG. 4 depicts a flow diagram illustrating exemplary steps performed by the host agent. As shown, the host agent determines whether it has received a request to instantiate a guardian agent (step 402). The request can be received, for example, as an input from a user or as a software input. In the illustrative example, the host agent can receive the request from a pilot of the fighter aircraft. When the request is received as a software input, the request can be received from the host agent itself or another program on the host agent platform. For example, if the host agent determines that it cannot communicate with a particular guardian agent, the host agent can itself request instantiation of a new guardian agent. To create the guardian agent, the host agent obtains a platform template, which instantiates the guardian agent (step 404). The platform template is an object that defines the information generation capabilities and information needs of the host agent platform. The platform template includes, for example, an identifier of the host agent platform, a description of the host agent platform, a security key, the host agent platform's information subscription requirements, and the host agent platform's information publication requirements. The information subscription requirements include, for example, the name of an information object, the time period of interest, the minimum rate of updates, and the maximum rate of updates. The information publications requirements include, for example, the name of an information object, the time period the information object will be published, and the publishing rate.

The platform template further comprises a platform characteristics code section 224 and a mobile code section 226. The platform characteristic code section is, for example, text or object data, that defines the host agent characteristics. In the illustrative example, the characteristics include information on the fighter aircraft's weapon system such as the weapon load, available fuel, location, operational capabilities, crew experience, current route and interface requirements.

The mobile code section includes plug-in modules for the guardian agent. As will be described below, the guardian agent subscribes to information available in the information network and provides timely information tailored to the needs of the host agent. In the illustrative example, the guardian agent also provides the capability for the host agent platform to respond to dynamic changes in mission such as re-targeting or servicing intelligence acquisition requests. The guardian agent does this by acquiring information from the information network and preparing new mission plans for the host agent platform. The guardian agent can also include a module that can provide "bids" for new missions based on requests from the command and control platform or other platforms connected to the information network. The guardian agent consists of a central core and modules that "plug into" the core. The modular design of the guardian agent allows the host agent platform itself to provide platform-specific implementation of guardian agent functionality. These modules are provided within the mobile code section of the platform template. Therefore, the guardian agent has mobile code capability that allows the data processing system on which the guardian agent runs not to require prior knowledge or implementation of the platform-specific behavior for the guardian agent.

Then, the host agent sends the platform template via the communication link to the guardian data processing system, where it is received and executed by a guardian server program 320 (step 406). The guardian server program extracts platform characteristics code section 224 and a mobile code section 226 from the platform template and instantiates the guardian agent using the extract information. The platform characteristic code section is used by the guardian server program to configure the instantiated guardian agent.

Once a guardian agent is instantiated for a particular host agent, the host agent can use the guardian agent to send information to and receive information from the information network via the communication link to the guardian agent. The guardian agent subscribes to information available on the information network and provides the subscribed-to information to the host agent. Therefore, the guardian agent adds capability to the host agent platform to access the information network, without straining the available resources of the host agent platform. In FIG. 4, if the host agent determines that it has received information from the guardian agent in step 408, then the host agent disseminates the received information to the host agent platform (step 410). For example, the host agent can display the received information on the display device for display to a user or transfer the information to another program.

If the host agent determines that information is to be transferred to the guarded platform in step 412, then the host agent sends the information to the guardian agent via the communication link (step 414). In the illustrative example, for example, if the fighter aircraft uses one or more of its weapons, the host agent can send an updated weapons status to the guardian agent.

The host agent can create multiple guardian agents and continues to send or receive information until the host agent determines that it should terminate execution (step 416).

Figure 5:
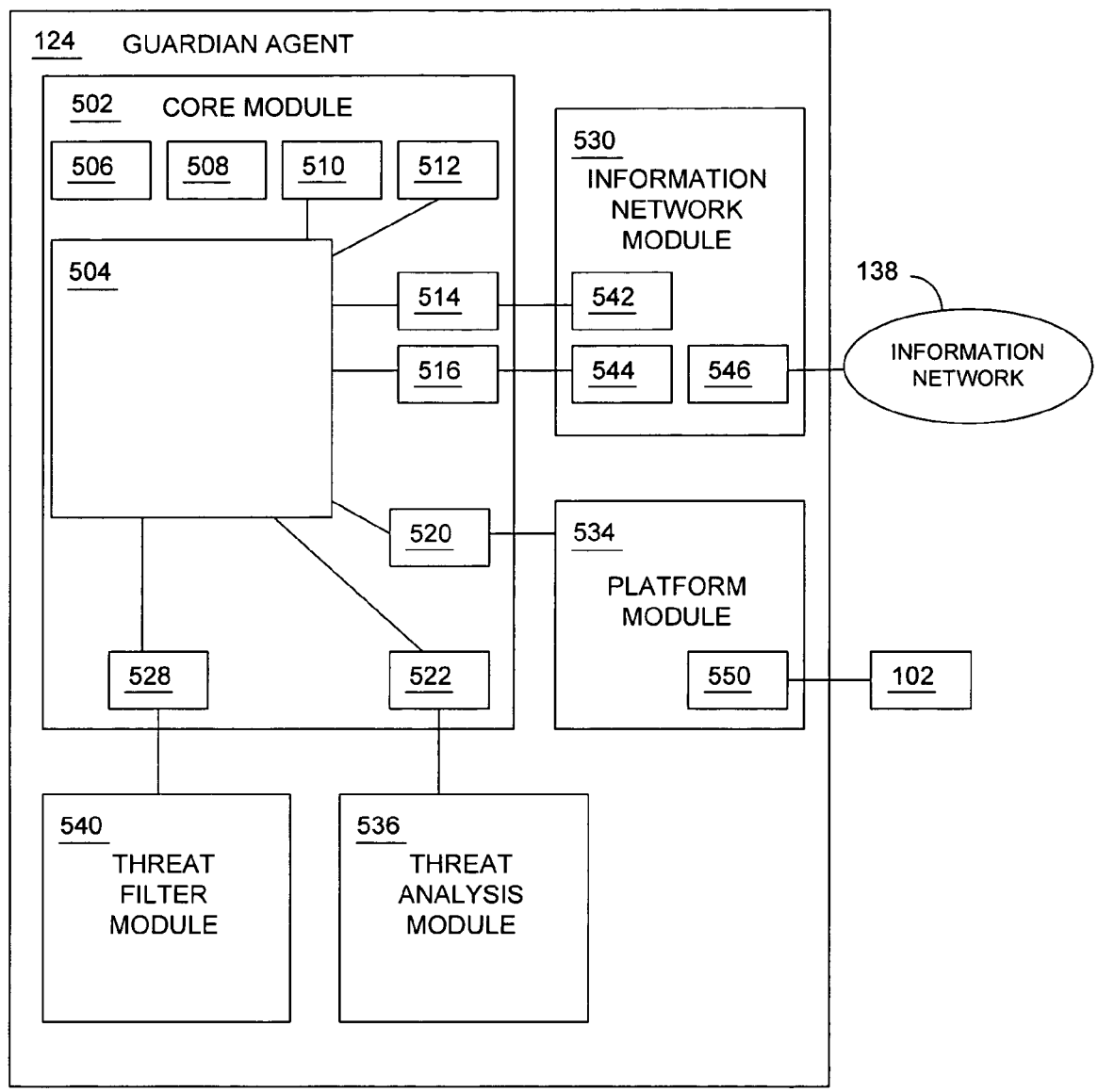
FIG. 5 is a block diagram of the guardian agent modules consistent with the present invention.

As briefly described above, the guardian agent has a modular architecture. Therefore, when the guardian agent is required to perform new or alternative tasks, these tasks can be implemented into an existing core module using different plug-in modules. Tasks can include, for example, threat analysis or interfacing to a specific platform type. FIG. 5 depicts a schematic block diagram of an illustrative guardian agent. One having skill in the art will appreciate that the exemplary modules in FIG. 5 are merely illustrative and alternative modules can be implemented. In the illustrative example, the modules are implemented in Java® programming language, however, the modules can be alternatively implemented in an alternative programming language. Java is a trademark or registered trademark of Sun Microsystems, Inc., Palo Alto, Calif., in the United States and other countries. All other product names used herein may be trademarks of their respective owners.

In the illustrative example, the guardian agent core module 502 includes an object called the GACore 504. This object controls the operation of the guardian agent. The guardian agent core module also includes of a series of abstract interfaces that can be accessed by the GACore object. These interfaces include a common approach for the core module to interact with different plug-in modules, such as a subscription manager interface 514, a publish manager interface 516, a platform interface 520, a threat analysis interface 522, and a threat filter interface 528. The core module also includes an implementation for the common data types that it needs to manipulate. These data classes include representations of such things as sensor reports 506, track reports 508, and other data. The core module also has a generic representation of the host agent platform's mission (via a mission proxy class 510) and platform physical properties (via a platform proxy class 512).

As depicted in FIG. 5, plug-in modules interface with the core module. The illustrative plug-in modules include an information network module 530, a platform module 534, a threat analysis module 536, and a threat filter module 540. The information network module 530 includes a subscription manager 542 for managing subscription information, a publish manager 544 for managing publishing information to the information network, and a communication application programming interface (API) 546 for interfacing to the information network. The communication API includes functionality to send and receive information via the information network.

Platform module 534 includes a communication manager 550 for interfacing to the communication link with the host agent platform. Threat analysis module 536 includes functionality for analyzing potential threats to the host agent or guarded platforms or to another platform. Threat filter module 540 compares information received from the information network to information about known threats to determine the need for a full and detailed threat analysis. The threat analysis module provides an implementation of a threat analyzer. The actual implementation can vary due to the type of host agent platform or level of analysis sophistication desired by the military service using the guardian agent. With this approach, different implementations of a threat analyzer can be seamlessly supported by the same guardian agent core module.

In the illustrative example, the fighter aircraft uses a threat analysis module that takes into account a detailed three-dimensional signature analysis. On the other hand, a lower cost unmanned platform may require the use of a simpler one-dimensional signature analysis. The guardian agent can accommodate both threat analysis implementations through the use of the modular design and interfaces. The differences in the implementations are isolated to the threat analysis module. The guardian agent core module code remains unchanged. This principle of design applies to the other implementations for the other plug-in modules.

The core module collaborates with the plug-in modules to implement tasks. For example, when the information network module receives information to which it has subscribed, the information network module transfers the information to the core module, which in turn transfers the information to the platform module to send to the host agent via the communication link. Similarly, when the host agent wants to send information to the information network, the host agent sends information via the communication link to the guarded platform, where it is received by the platform module. The platform module in turn transfers the information to the core module, which transfers the information to the information network module for publishing to the information network.

Figure 6:
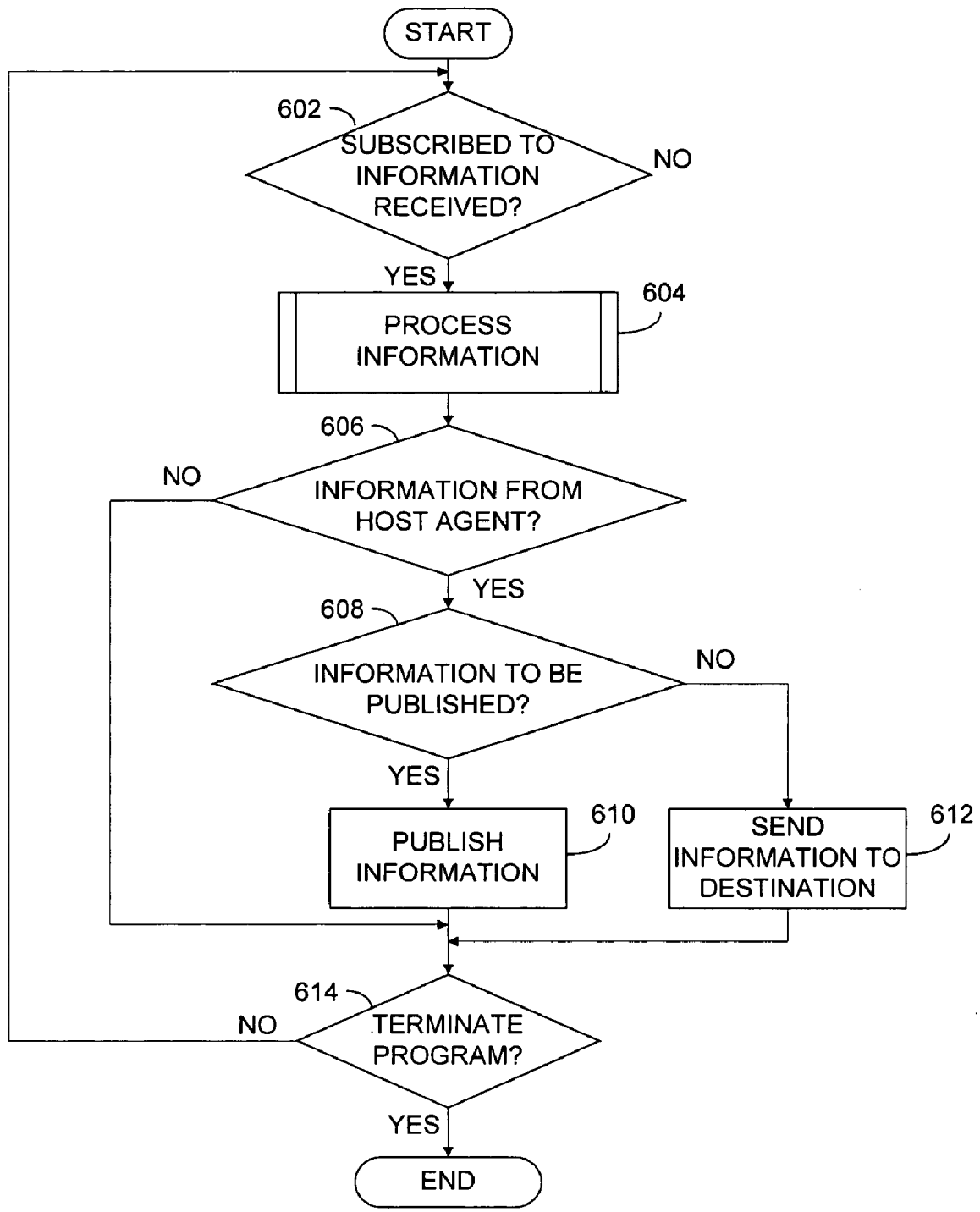
FIG. 6 is a flow diagram of the exemplary steps performed by the guardian agent consistent with the present invention.

FIG. 6 depicts a flow diagram of exemplary steps performed by the core module. In step 602, the core module determines whether it has received subscribed-to information from the information network. This is performed, for example, by information network module 530 receiving information from the information network that corresponds to a subscription criteria in subscription manager 542. The information network module transfers the information to the core module via subscription manager interface 514. The information can be, for example, a weather report, a sensor report, or image data for the host agent platform. Further, the information can be received from another guardian agent that publishes the information to the information network. Therefore, guardian modules can communicate with each other when the guardian modules have information to contribute to the respective host agent platform. However, as the guardian modules use a publish-subscribe scenario, the guardian agents are not dependent upon each other or another information source. Then, the core module processes the received information (step 604).

Figure 7:
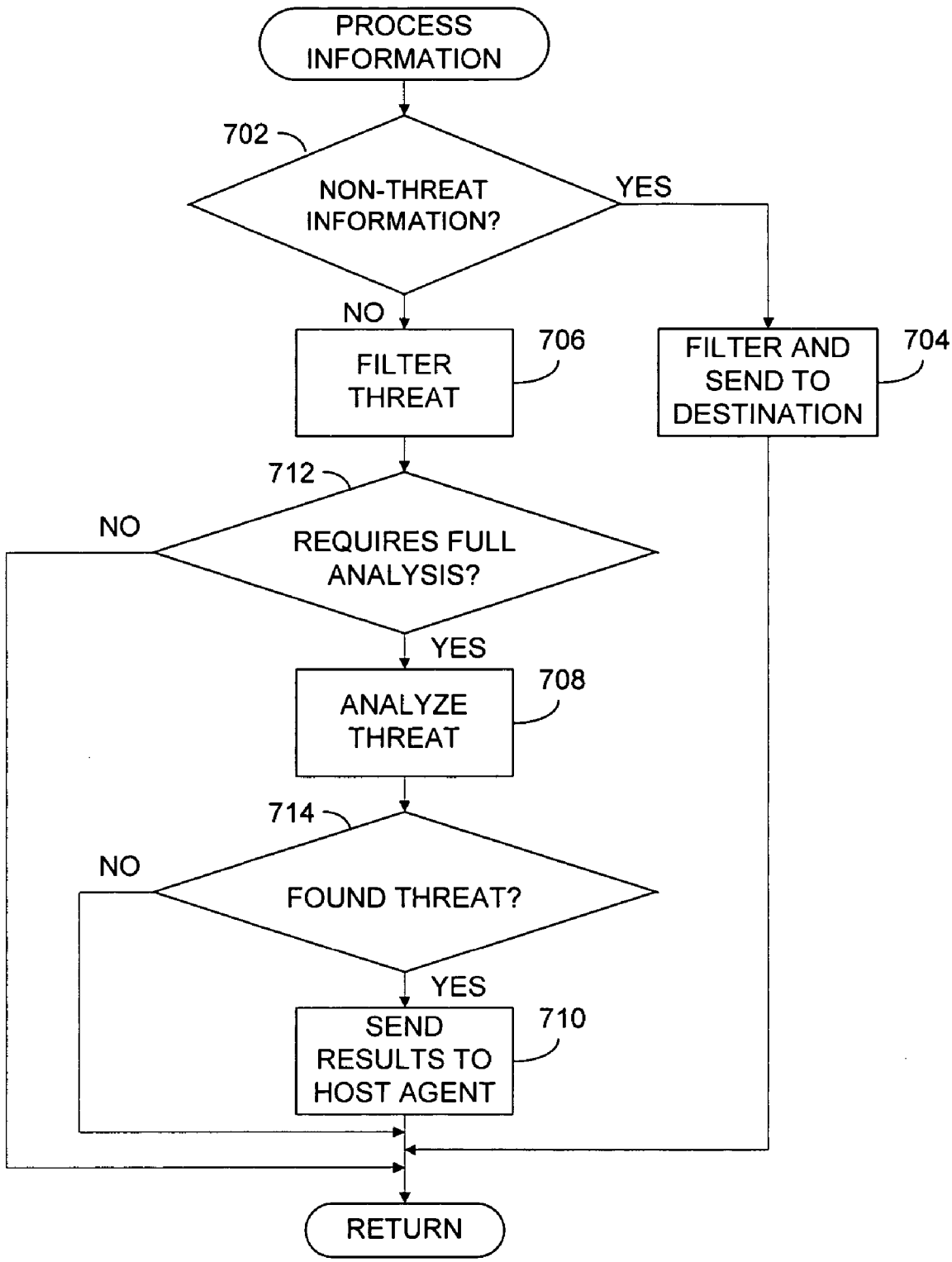
FIG. 7 is a flow diagram of the exemplary steps performed by the guardian agent for processing subscribed to information.

FIG. 7 is a flow diagram illustrating step 604 in more detail. In step 702, the core module determines whether the received information is non-threat related information. This is done, for example, by determining whether the received information is a sensor report that contains information about a potential threat. If the received information is not threat-related information, then the core module sends the received information to an appropriate destination (step 704). For example, if the received information is a sensor report, then the received information can be maintained in memory with the core module. However, if the received information is route data for the host agent platform, then the received information is transferred to the host agent platform via the communication link.

If the core module determines in step 702 that the received information is threat-related information, then the core module passes the received information through the threat filter module (step 706). The threat filter module compares the received information to known threats in a threat database, which is stored in the guardian data processing system memory or secondary storage. For example, the threat filter compares the received information to known enemy aircraft or vehicles. The core module receives the results of the threat filter module's analysis. If the threat filter determines in step 712 that no further analysis is required, processing is complete. If the threat filter determines in step 712 that the report is for a potential threat, the information is sent to the threat analysis module (step 708). The threat analysis module determines whether the threat-related information is a threat to the fighter aircraft. This is done, for example, by determining whether the threat is within a sensitive range or is moving toward the fighter aircraft or guarded platform.

The core module receives the results of the threat analysis module. If the threat analysis module in step 714 determines that there is no threat, processing is complete. If the threat analysis module in step 714 determines that there is a threat, the core module sends the results of the threat analysis to the host agent platform (step 710). The results include, for example, the identity and position of the threat. Further, the results may include updated mission information or route information responsive to the threat.

Referring back to FIG. 6, after the information is processed in step 604 or if the core module determines that subscribed to information has not been received in step 602, then the core module determines whether it has received information from the host agent platform (step 606). Information from the host agent platform is received via the communication link by platform interface 520. The information can be, for example, the host agent platform's current route, weapons status, or information to be published to the information network. After the information is received from the host agent platform in step 606, the core module determines whether the information is to be published to the information network (step 608). This determination is made, for example, by determining whether the received information is of a particular class. For example, if the received information is of a video file class, which are known to the core module to be published to the information network, then the core module determines that the received information should be published.

If the core module determines in step 608 that the received information should be published, then the core module effects publication of the information (step 610). This is done by transferring the received information to the information network module via publish manager interface 516. Publish manager 544 in the information network module then publishes the received information to the information network.

If the core module determines in step 608 that the received information should not be published, the core module transfers the received information to its appropriate destination (step 612). The received information is transferred to an appropriate destination, for example, by identifying a destination associated with the received information's class from a lookup table in memory. For example, the core module can send the received information to the sensor report.

If the core module determines in step 606 that information has not been received from the host agent platform, or after the received information is processed in step 610 or step 612, then the core module determines whether it should continue execution (step 614). If the core module should continue execution, then the program flow returns to step 602.

Therefore, the guardian agent provides the host agent platform with the capability to access information from the information network without straining onboard resources at the host agent platform. In the illustrative example, the guardian agent resides off-board the fighter aircraft, thus freeing resources for the fighter aircraft. The guardian agent filters information received from the information network prior to sending the information to the host agent to further reduce the strain on resources at the host agent platform. Accordingly, methods, systems and articles of manufacture consistent with the present invention provide a platform, which may not have the capability to directly access an information network, with access to the information network using the host agent and guardian agent.

The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, the described implementation includes software but the present implementation may be implemented as a combination of hardware and software or hardware alone. Further, the illustrative processing steps performed by the program can be executed in an different order than described above, and additional processing steps can be incorporated. The invention may be implemented with both object-oriented and non-object-oriented programming systems. The scope of the invention is defined by the claims and their equivalents.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense

What is claimed is:

1. A method in a first data processing system having a program for providing access to a network via a second data processing system, the method performed by the program comprising:
    receiving a request to instantiate a network access program on the second data processing system;
    obtaining an object that can instantiate the network access program on the second data processing system, the object including information on the information publication requirements and information subscription requirements of the first data processing system;
    sending to the second data processing system the object which, when instantiated on the second data processing system, implements the network access program that can subscribe to information from the network and publish information to the network, the network access program subscribing to information that has been identified by the first data processing system and that matches a dynamic schematic rule set specified by the first data processing system in the information subscription requirements;
    receiving information that has been subscribed to by the network access program from the second data processing system; and
    sending information to the network by sending information to the second data processing system for publication to the network by the network access program, wherein the network access program determines if the information sent is published to the network and wherein published information is accessible by a third data processing system.

2. The method of claim 1, wherein the network access program determines whether to send subscribed to information received from the network to the first data processing system, wherein the determination includes filtering based on dynamically published information by the first data processing system to the network through the second data processing system.

3. The method of claim 1, wherein the network is a global information grid.

4. A computer-readable medium encoded with computer executable instructions that cause a first data processing system having a program to perform a method for providing access to a network via a second data processing system, the method performed by the program comprising:
    receiving a request to instantiate a network access program on the second data processing system;
    obtaining an object that can instantiate the network access program on the second data processing system, the object including information on the information publication requirements and information subscription requirements of the first data processing system;
    sending to the second data processing system the object which, when instantiated on the second data processing system, implements the network access program that can subscribe to information from the network and publish information to the network, the network access program subscribing to information that has been identified by the first data processing system and that matches a dynamic schematic rule set specified by the first data processing system in the information subscription requirements;
    receiving information that has been subscribed to by the network access program from the second data processing system; and
    sending information to the network by sending information to the second data processing system for publication to the network by the network access program, wherein the second data processing system enables a generalized bidding process whereby the second data processing system can bid on missions based on capabilities of the first data processing system for dynamic mission requests from a command and control platform, wherein the publication to the network facilitates presenting an output to a user.

5. The computer-readable medium of claim 4, wherein the network access program determines whether to send subscribed to information received from the network to the first data processing system, wherein the determination includes filtering based on dynamically published information by the first data processing system to the network through the second data processing system.

6. The computer-readable medium of claim 4, wherein published information sent by the first data processing system to the network is accessible by a third data processing system.

7. The computer-readable medium of claim 4, wherein the received information includes notification of threatening entities to the first data processing system based on dynamically published information by the first data processing system.

8. A first data processing system for providing access to the United States military's global information grid via a second data processing system, the data processing system comprising:
    a memory having a program that
    receives a request to instantiate a network access program on the second data processing system;
    obtains an object that can instantiate the network access program on the second data processing system, the object including information on the information publication requirements and information subscription requirements of the first data processing system;
    sends to the second data processing system the object which, when instantiated on the second data processing system, implements the network access program that can subscribe to information from the global information grid and publish information to the global information grid, the network access program subscribing to information that has been identified by the first data processing system and that matches a dynamic schematic rule set specified by the first data processing system in the information subscription requirements, and receives information that has been subscribed to by the network access program from the second data processing system; and a processing unit configured to run the program.

9. The data processing system of claim 8, wherein the program sends information to the network by sending information to the second data processing system for publication to the network by the network access program, wherein published information is accessible by a third data processing system.

10. The data processing system of claim 8, wherein the network access program determines whether to send subscribed to information received from the network to the first data processing system, wherein the determination includes filtering based on dynamically published information by the first data processing system to the network through the second data processing system.

11. The data processing system of claim 8, wherein the received information includes threat-related information, the received information passing though a threat filter to compare the received information to known threats in a threat database, the known threats associated with the first data processing system.

12. The data processing system of claim 8, wherein the network provides the first data processing system with virtual target folders containing information on time critical targets.

13. A first data processing system for providing access to a network via a second data processing system, the data processing system comprising:

means for a program in memory of a first data processing system to receive a request to instantiate a network access program on the second data processing system;

means for a program to obtain an object that can instantiate the network access program on the second data processing system, the object including information on the information publication requirements and information subscription requirements of the first data processing system;

means for the program to send to the second data processing system the object which, when instantiated on the second data processing system, implements the network access program that can subscribe to information from the network and publish information to the network, the network access program subscribing to information that has been identified by the first data processing system and that matches a dynamic schematic rule set specified by the first data processing system in the information subscription requirements;

means for the program to receive information that has been subscribed to by the network access program from the second data processing system; and means for the program sending information to the network by sending information to the second data processing system for publication to the network by the network access program, the published information being accessible by a third data processing system.

* * * * *